Jan. 10, 1961   HANS-JOACHIM M. FOERSTER   2,967,395
HYDROSTATIC TRANSMISSION
Filed Aug. 13, 1956                    3 Sheets-Sheet 1

INVENTOR
HANS-JOACHIM M. FÖRSTER

BY  Dike and Craig

ATTORNEYS

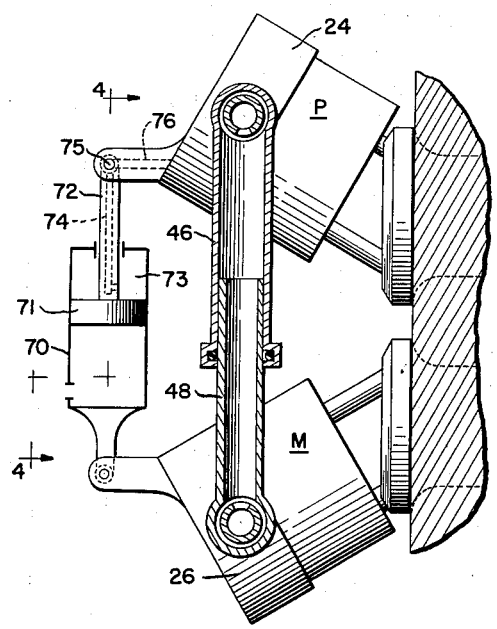
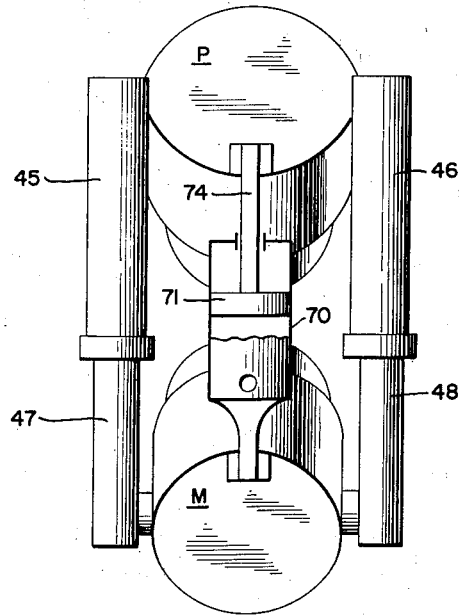

Jan. 10, 1961 HANS-JOACHIM M. FOERSTER 2,967,395
HYDROSTATIC TRANSMISSION
Filed Aug. 13, 1956 3 Sheets-Sheet 3
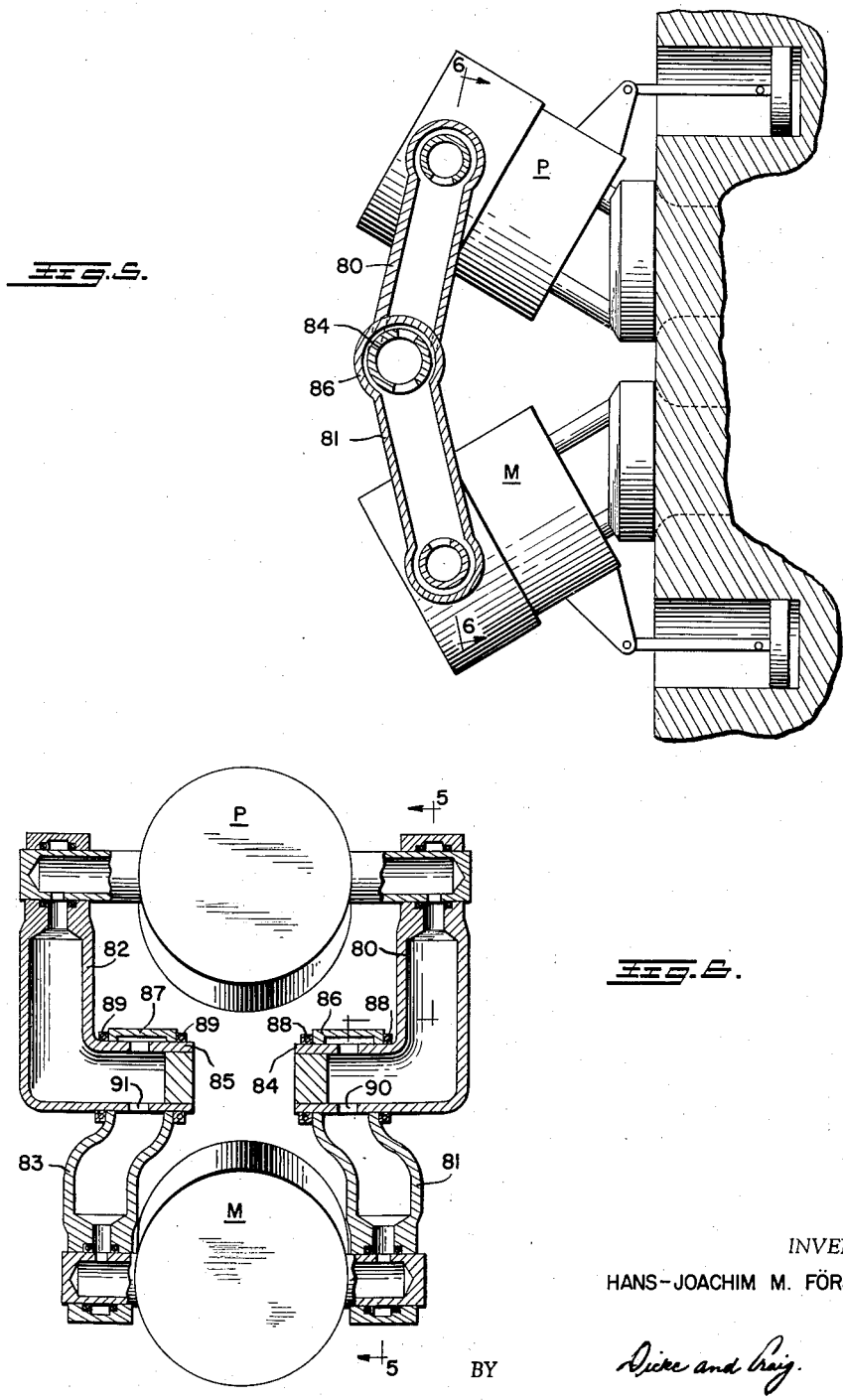
INVENTOR
HANS-JOACHIM M. FÖRSTER
BY
ATTORNEYS

United States Patent Office 2,967,395
Patented Jan. 10, 1961

2,967,395

HYDROSTATIC TRANSMISSION

Hans-Joachim M. Foerster, Stuttgart-Bad Cannstatt, Germany, assignor to Daimler-Benz Aktiengesellschaft, Stuttgart-Unterturkheim, Germany Filed Aug. 13, 1956, Ser. No. 603,543

Claims priority, application Germany Aug. 16, 1955

17 Claims. (Cl. 60—53)

The present invention relates to a hydrostatic transmission with a slewable cylinder housing of the transmission pump and/or of the transmission motor and aims in particular at a simplification of such transmissions, especially as regards the means for guiding or conducting the hydraulic medium which operatively couples the transmission pump with the transmission motor.

The present invention accordingly consists essentially in that the transmission pump and the transmission motor are connected by a rod or linkage system which simultaneously contains or forms the lines for the hydraulic connection between the pump and motor.

Preferably a guide member pivotally connected, on the one hand, at the cylinder housing of the pump and, on the other, at the cylinder housing of the motor is used as connecting rod system. This guide member may be formed rigidly in itself, if the pump and motor are to be slewable together as a unit, while it forms then simultaneously the connecting rods between the pump and motor.

If, however, an independent or individual slewability of the cylinder housings of the transmission pump and transmission motor with respect to each other is to be made possible, the connecting rod system is formed in a particularly preferred embodiment of the present invention as telescopically adjustable tubular guide member, i.e., which may be lengthened or shortened by telescoping two tubular members into each other. The hydraulic working fluid may thereby be conducted through the interior of the rod system or of the tubular guide member between the pump and motor.

Since in the case of a telescopic construction of the guide member, pressure forces are developed by the hydraulic working medium, which tend to force the telescopic parts apart, it is appropriate to additionally provide in connection with such a construction a pressure equalization means, especially in such a manner, that the rod portions are provided with relief pistons and cylinders respectively which are loaded by the same hydraulic pressure medium in the opposite direction so as to effectively counteract or balance the forces to which the telescopic parts are normally subjected by the hydraulic pressure medium.

The relief pistons may thereby be arranged directly at the rod system, preferably in a pair-like manner on both sides thereof, or may be interconnected between the cylinder housings of the pump and motor aggregates which are slewable relative to each other parallel to the rod system.

The rods of the rod system or linkage are preferably pivotally connected in pairs at the cylinder housings of the pump and motor on both sides thereof, for example, by any suitable jointed connection, whereby one rod system, for example, conducts the hydraulic medium from the pump to the motor and the other rod system from the motor to the pump.

According to another preferred embodiment in accordance with the present invention the connecting rod system is formed by two guide members connected in series behind each other by means of knee-like joints whereby the hydraulic working medium or fluid is conducted successively through the guide members, the hollow spaces of which are in communication with each other in the common joint.

Accordingly, it is an object of the present invention to provide a simplification for hydrostatic transmissions, and more particularly, to provide a simplification of the control of the hydrostatic transmissions particularly of those transmissions in which both the pump and motor aggregate are slewable independently of one another.

Another object of the present invention is to provide a connecting rod system between the pump and motor aggregate of a hydrostatic transmission which at the same time serves as conduit means for the hydraulic fluid medium of the pump and motor.

Still another object of the present invention is the provision of tubular connecting rod systems connecting the pump and motor aggregates of a hydrostatic transmission in such a manner as to enable telescopic adjustment of the telescoping portions of the tubular rod system while at the same time providing means to counteract or balance the forces produced by the hydraulic pressure medium in the telescopic tubular portions which tend to spread the telescopic parts of the connecting rod system apart.

Consequently, a still further object of the present invention resides in the provision of means connecting the pump and motor aggregates of a hydrostatic transmission which at the same time forms the conduit for the hydraulic medium and which is adjustable in length while at the same time being provided with means to counteract the forces tending to spread apart the adjustable portions thereof.

Further objects, features and advantages of the present invention will become more obvious from the following description when taken in connection with the accompanying drawing which shows, for purposes of illustration only, several embodiments in accordance with the present invention and wherein:

Figure 3 is a partial view, similar to Figure 1 with certain parts omitted for simplicity's sake, of a second embodiment of a hydrostatic transmission in accordance with the present invention, partially in cross section and taken in part along line 3—3 and in part along line 3'—3' of Figure 4;

Figure 4 is a cross-sectional view taken along line 4—4 of Figure 3;

Figure 5 is a partial side view of a third embodiment of a hydrostatic transmission in accordance with the present invention partially in cross section taken along line 5—5 of Figure 6; and Figure 6 is a cross-sectional view of the connecting rod system inter-connecting the transmission pump and motor and taken along line 6—6 of Figure 5 in which the pump and motor are indicated only schematically.

Figure 1:
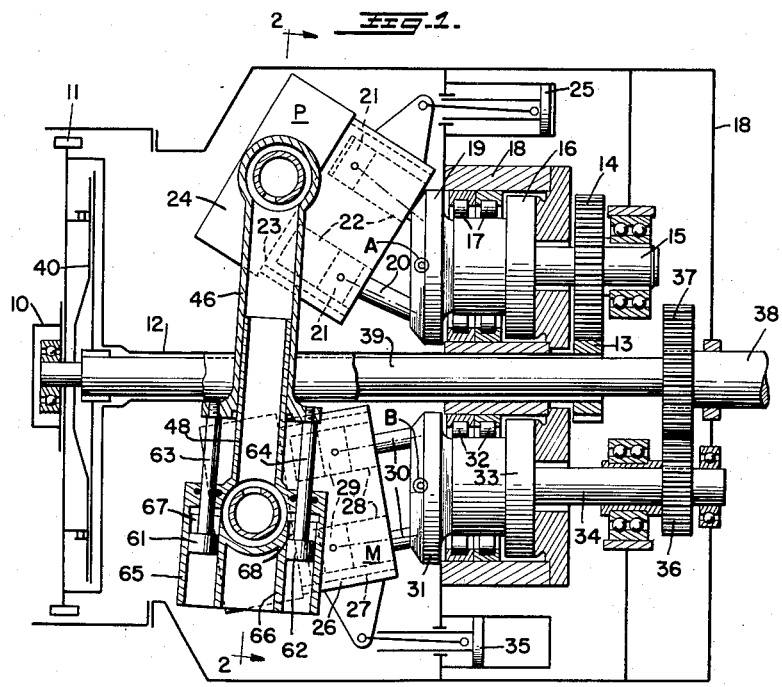
Figure 1 is a side view of a first embodiment of a hydrostatic transmission in accordance with the present invention taken in part along line 1—1 and in part along line 1'—1' of Figure 2.
Figure 2:
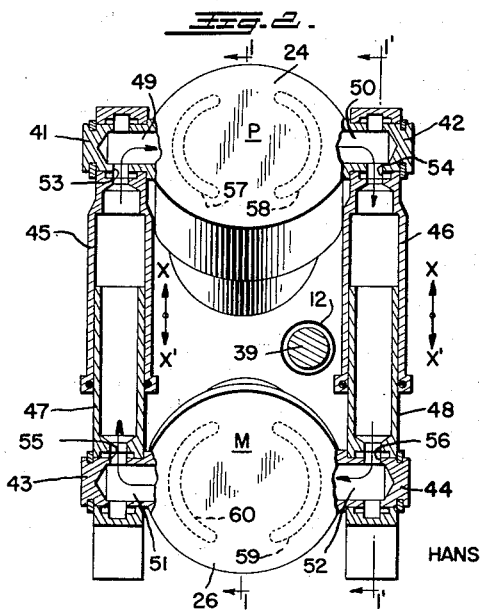
Figure 2 is a cross-sectional view through the lateral guide members taken along line 2—2 of Figure 1 showing schematically the pump and motor aggregates.

Referring now more particularly to the drawing, wherein like reference numerals are used throughout the various views to designate corresponding parts, reference numeral 10 designates in Figures 1 and 2 the engine shaft which is drivingly connected over the flywheel 11 with the hollow driving shaft 12 of the hydrostatic transmission. The hollow driving shaft 12 is in constant driving connection with the pump shaft 15 of the hydrostatic transmission by means of a gear wheel connection consisting of meshing gear wheels 13 and 14. The driving disk 19 which effectively constitutes a swash plate, and which is supported against a thrust bearing 16 and journalled in the stationary housing 18 by bearing 17 is drivingly connected with the pump shaft 15. The piston rods 20 for the pistons 21 are supported in the driving disk 19, the pistons being reciprocated in the cylinders 22 of the cylinder drum 23 which rotates together with the pump shaft 15. The rotating drum 23 is rotatably supported in the non-rotatable housing 24 of the transmission pump P. The non-rotatable housing 24 of the transmission pump P in turn is pivotally or slewably supported in the stationary housing 18 and may be rotated about an axis A by means of an adjusting piston 25 to assume a position of lesser or greater angle of inclination with respect to the axis of the driving shaft 12 or the pump shaft 15. Depending on the angle of inclination, the pistons 21 carry out a smaller or larger piston stroke in the corresponding cylinders 22 with each rotation of the pump drive shaft 15.

The transmission motor M is constructed in a similar manner as pump motor P. The slewable, but non-rotatable cylinder housing 26 of the transmission motor M contains, in a manner similar to that of the cylinder housing 24 of the transmission pump P, a rotating cylinder drum 27 provided with cylinders 28 in which the pistons 29 reciprocate which in turn are connected by means of connecting rods 30 with the driving disk or swash plate 31. The driving disk 31 is journalled in the stationary housing 18 by means of bearings 32. Moreover, the driving disk 31 is supported against the housing 18 by means of a thrust bearing 33 and is rigidly connected with the motor shaft 34. The non-rotatable cylinder housing 26 of the motor M is slewably or swingably supported in the stationary housing 18 and may be rotated about a transverse axis of rotation B with respect to the housing 18 by means of a piston 35 to assume a position of lesser or greater angle of inclination with respect to the axis of the motor shaft 34. Depending on the angle of inclination, the pistons 29 carry out a smaller or larger piston stroke in the corresponding cylinders 28 with each rotation of the motor shaft 34.

The motor shaft 34 is in constant driving engagement with the driven shaft 38 by means of a pair of gear wheels 36 and 37. The driven shaft 38 extends forwardly as an internal shaft 39 through the hollow drive shaft 12, and may be directly coupled therewith and therefore also with the crankshaft 10 of the driving engine by means of a clutch 40 thereby establishing a direct speed in by-passing relationship to the hydrostatic transmission. The wheels of a motor vehicle or of another machine may be driven from the shaft 38, for example, over a differential gear.

The slewable but non-rotatable cylinder housings 24 and 26 of the pump P and of the motor M, respectively, are furthermore connected with each through telescopically formed rods which simultaneously serve as lines for conducting the working fluid hydraulically coupling the pump with the motor.

For that purpose, the pump cylinder 24 is provided with lateral pins 41 and 42 (Figure 2) while the cylinder casing 26 of the motor M is provided with lateral pins 43 and 44. The telescopic pipes or tubes 45, 46, 47 and 48 are rotatably supported on the pins 41, 42, 43, and 44 respectively, whereby the tubes or pipes 45 and 47, on the one hand, and the tubes or pipes 46 and 48, on the other, are telescopically arranged with respect to each other and form pairwise on both sides of the pump P and the motor M a telescopic guide member each of which the guide member 45, 47 connects pins 41 and 43 and the other guide 46, 48 connects pins 42 and 44 with one another.

The hollow spaces 49, 50, 51 and 52 of the hollow pins 41, 42, 43 and 44 are in communication through apertures 53, 54, 55 and 56 with the interior spaces of the telescopic pipes 45, 46, 47 and 48 which are supported on pins 41, 42, 43 and 44 respectively.

In the drawing, the assumed direction of flow of the working fluid between the pump and motor are indicated by arrows, whereby reference numerals 57 and 58 designate the suction and pressure space of the pump P, while reference numerals 59 and 60 designate the pressure and discharge space of the motor M.

In operation, the piston drum 23 together with the pistons 21 of the pump P are rotated by means of the rotating pump shaft 15, while simultaneously therewith the pistons 21 are reciprocated with a larger or smaller stroke depending on the inclination of the slewable cylinder casing 24 of the pump P with respect to the pump shaft axis.

As a result thereof, the working fluid is drawn in through the interior of the guide member 47, 45, over the hollow space 49 into the suction space 57 of the pump P from where it is fed to the corresponding individual cylinders 22 during the suction stroke of the respective pistons 21 thereof.

The working fluid is fed or supplied from these pistons 21 of the pump P which undergo the pressure stroke, over the pressure space 58 and the hollow space 50 in the pin 42 into the interior of the telescopic guide member 46, 48 and from there over the hollow space 52 of the pin 44 to the pressure space 59 of the motor M from where the working fluid enters the corresponding cylinders 28 of the motor while doing work thereat by moving pistons 29 outwardly and thereby setting the motor shaft 34 into rotation at a speed depending on the inclination of the cylinder casing 26. After performing the work, the fluid medium may again flow off over the discharge space 60 and the hollow space 51 in the pin 43 into the interior of the telescopic guide member 47, 45.

As a result of the pressure of the hydraulic fluid or working medium which flows through the guide member 45, 47 and especially which flows through the guide member 46, 48, the guide member portions or telescopic sleeves are forced apart in the direction of the arrow x—x' whereby the pressure has a tendency to slew or swing the casings 24 or 26 outwardly about the pivot axis A and B respectively, i.e., away from one another.

In order to absorb this undesired pressure, the guide part 46, as well as possibly also the corresponding guide member part 45, is provided with equalization pistons 61 and 62 which are connected with the ends of the guide member part 46 through piston rods 63 and 64 and which slide in cylinders 65 and 66 rigidly connected with the guide member 48. In case of an equalization means for guide member 45, 47, similar pistons and cylinders are connected with the corresponding parts 45 and 47. Pressure spaces 67 and 68 are formed between the cylinder 65 and piston 61 and the cylinder 66 and piston 62 respectively which are connected in an appropriate manner with the circulatory system of the hydraulic medium, for example, with the interior of the guide member parts 48 and 47 respectively. The pressure which prevails in the pressure spaces 67 and 68 thereby applies a force to or loads the guide member parts 48 and 46 or 47 and 45 respectively in such a direction which is opposed to the pressures developed by the fluid medium flowing through the guide members themselves, the effective piston surfaces being dimensioned in such a manner that these pressures exactly balance each other.

The sum total of the reaction forces which act on the cylinder casings 24 and 26 of the pump P and of the motor M respectively, are therefore always zero and independent of the pressure of the hydraulic working fluid. The slewing movement of the cylinder casings 24 and 26 about the axis A and B may, therefore, take place without any counter-pressure caused by the hydraulic medium in that the guide member 46, 48 and 45, 47 respectively are lengthened or shortened telescopically.

The use of one equalization arrangement each for the pressure and suction side of the hydrostatic transmission offer the advantage of a complete equalization for both sides, an interchangeability of the parts with respect to each other as well as an independence of the transmission as regards the direction of the drive so that pressure and suction side of the transmission may be interchanged with each other without difficulty.

The embodiment according to Figures 3 and 4 differentiates itself from the embodiment of Figures 1 and 2 essentially in that a parallel equalization rod system is used for purposes of equalization of the pressure of the fluid which flows through the telescopic guide members 45, 47 and 46, 48.

The equalization rod system of the embodiment according to Figures 3 and 4 essentially consists of a cylinder 70 connected with the cylinder casing 26 of the motor M and of the equalization piston 71 with piston rod 72 which is connected with the casing 24 of the pump P. The pressure space 73 between the cylinder 70 and the piston 71 in that case is in communication with the pressure side of pump P over a bore 74 in the piston rod 72, a bore 75 in the pivot pin of the piston rod 72 and a cross bore 76. A second pressure equalization arrangement may be dispensed with. However, it is understood that separate equalization rod system each, such as shown in Figures 3 and 4, may also be associated with the pressure side as well as with the suction side of the hydrostatic transmission.

The embodiment according to Figures 5 and 6, for purposes of hydraulically connecting the pump P and the motor M, provides a rod system or linkage consisting of two pairs of guide members connected by knee-like joints of which one pair consists of the guide members 80 and 81 and the other of the guide members 82 and 83. The upper guide members 80 and 82 are bent at right angles so as to form pins 84 and 85 on which the heads 86 and 87 of the lower guide members 81 and 83 are pivotally supported. Appropriate seals or packings 88 and 89 may be provided to seal the guide members 80 and 81 as well as 82 and 83 with respect to each other. The interior spaces of two interconnected guide members are in communication with each other through apertures 90 and 91 in the walls of the pin-shaped parts 84 and 85 of the upper guide members 80 and 82 respectively. As the pressure forces of the hydraulic working medium in that case directly equalize or balance themselves in the common joints at the pin parts 84 and 85 and at the joint heads 86 and 87 respectively, separate equalization arrangements may be dispensed with in this embodiment.

As to the rest, the operation of the embodiment according to Figures 5 and 6 is the same as in connection with the embodiments described hereinabove.

While I have shown and described several preferred embodiments in accordance with the present invention, it is understood that the same is susceptible of many changes and modifications within the spirit of the present invention, and I intend to cover all such changes and modifications except as defined by the appended claims.

I claim:
1. A hydrostatic transmission having a relatively stationary part comprising a hydraulic pump unit and a hydraulic motor unit placed laterally alongside each other, each of said units including rotatable cylinder means having an axis of rotation and piston means reciprocatingly arranged within said cylinder means, casing means for each of said cylinder means, shaft means in each of said units operatively connected with the respective cylinder means, at least one of said casing means being pivotally supported about a pivot axis extending essentially transversely with respect to the axis of rotation of the corresponding cylinder means, adjusting means pivoting at least said one casing means with respect to said relatively stationary part about said pivot axis for varying the capacity of the corresponding unit, and rod means pivotally connected with said casing means about an axis disposed essentially parallel to and non-coincidental with the respective pivot axis thereof constituting fluid conduit means between said units and including means effectively equalizing the forces produced by the pressure of the hydraulic medium in said transmission flowing through said fluid conduit means.

2. A hydrostatic transmission according to claim 1, wherein said last-mentioned means effectively equalizing the forces is operatively connected with said fluid conduit means so as to be operated by the fluid medium thereof in a manner to balance the forces produced thereby within said conduit means.

3. A hydrostatic transmission having a relatively stationary part, comprising a hydraulic pump unit and a hydraulic motor unit placed laterally alongside each other, each of said units including rotatable cylinder means having an axis of rotation and piston means reciprocatingly arranged within said cylinder means, casing means for each of said cylinder means, shaft means in each of said units operatively connected with the respective cylinder means, at least one of said casing means being pivotally supported about a pivot axis extending essentially transversely with respect to the axis of roation of the corresponding cylinder means, adjusting means pivoting at least said one casing means with respect to said relatively stationary part about said pivot axis for varying the capacity of the corresponding unit, and rod means adjustable in length and pivotally connected with said casing means about an axis disposed essentially parallel to and non-coincidental with the respective pivot axis thereof constituting fluid conduit means between said units and including equalizing means effectively equalizing the forces produced by the pressure of the hydraulic medium in said transmission flowing through said fluid conduit means and normally tending to urge the adjustable rod means apart.

4. A hydrostatic transmission having a relatively stationary part and operative with a hydraulic medium adapted to produce pressure forces, comprising a hydraulic pump unit and a hydraulic motor unit placed laterally alongside each other, each of said units including rotatable cylinder means having an axis of rotation and piston means reciprocatingly arranged within said cylinder means, casing means for each of said cylinder means, a shaft in each of said units operatively connected with the respective cylinder means, the axis of each of said casing means forming an angle with its respective shaft, at least one of said casing means being pivotally supported about a pivot axis extending essentially transversely with respect to the axis of rotation of the corresponding cylinder means, adjusting means pivoting at least said one casing means with respect to said relatively stationary part about said pivot axis for varying the capacity of the corresponding unit, and hollow rod means pivotally connected with said casing means about an axis disposed essentially parallel to and non-coincidental with the respective pivot axis thereof constituting fluid conduit means between said units.

5. A hydrostatic transmission having a relatively stationary part and operative with a hydraulic medium adapted to produce pressure forces, comprising a hydraulic pump unit and a hydraulic motor unit placed laterally alongside each other, each of said units including rotatable cylinder means having an axis of rotation and piston means reciprocatingly arranged within said cylinder means, casing means for each of said cylinder means, a shaft in each of said units operatively connected with the respective cylinder means, said shafts being disposed essentially parallel with each other, the axis of each of said casing means forming an angle with its respective shaft, at least one of said casing means being pivotally supported about a pivot axis extending essentially transversely with respect to the axis of rotation of the corresponding cylinder means, adjusting means pivoting at least said one casing means with respect to said relatively stationary part about said pivot axis for varying the capacity of the corresponding unit, adjustable hollow rod means constituting fluid conduit means between said units, and pivotal connecting means pivotally connecting said hollow rod means with the respective casing means thereof about an axis disposed essentially parallel to and non-coincidental with the respective pivot axis thereof.

6. A hydrostatic transmission according to claim 5, wherein said rod means are arranged in pairs, one on each side of said casing means, the rod means located on one side of said casing means conducting the hydraulic medium from said pump unit to said motor unit, while the rod means located on the other side of said casing means conduct the hydraulic medium from said motor unit back to said pump unit.

7. A hydrostatic transmission according to claim 5, wherein said adjustable hollow rod means form guide means between said two casing means, and wherein said pivotal connecting means pivotally connecting said hollow rod means with the respective casing means thereof includes hollow pivot pins secured to said casing means, the hollow interior of said rod means being in communication with said pump unit and motor unit through said hollow pins.

8. A hydrostatic transmission according to claim 4, wherein each of said rod means is composed of two tubular guide members connected in series and forming knee-like joint means therebetween.

9. A hydrostatic transmission according to claim 4, wherein said hollow rod means includes a rigid tubular member pivotally connected with said cylinder casing means of the pump unit, a rigid tubular member pivotally connected with said cylinder casing means of the motor unit, and both of said tubular members being pivotally connected with each other.

10. A hydrostatic transmission as claimed in claim 4, wherein said rod means includes at least one telescopically adjustable tubular guide member.

11. A hydrostatic transmission as claimed in claim 4, further comprising means operatively connected with said rod means for counteracting the pressure forces produced by the hydraulic pressure medium flowing through said fluid conduit means and tending to force the same apart.

12. A hydrostatic transmission according to claim 2, wherein said rod means includes telescopically arranged guide members, and wherein said last-mentioned equalizing means includes a cylinder and a piston sliding in said cylinder, said cylinder being connecting directly with one of said guide members and said piston with the other guide member.

13. A hydrostatic transmission according to claim 12, wherein a pair of each of said cylinder and piston are provided with said telescopically arranged guide members, one pair each being arranged on each side thereof.

14. A hydrostatic transmission according to claim 3, wherein said equalizing means includes cylinder means and piston means in said cylinder means, means operatively connecting said cylinder means with one of said casings and said piston means with the other of said casings, and means for actuating said piston means by said hydraulic medium.

15. A hydrostatic transmission according to claim 14, wherein said rod means includes tubular telescopically arranged guide members forming said fluid conduit means, and wherein said piston and cylinder means are formed as additional telescopic guide members between said casing means and in parallel with said rod means.

16. A hydrostatic transmission according to claim 14, wherein said means connecting said piston means with one of said casing means includes a hollow connecting rod simultaneously serving as conduit for feeding said hydraulic medium to said cylinder means.

17. A hydrostatic transmission according to claim 8, wherein one of said two guide members connected in series is bent at an angle of approximately 90 degrees and forms the pivot pin for the other one of said guide members which forms a pivot head and is placed over said last-mentioned pivot pin, said last-mentioned pivot pin and pivot head being provided with apertures to enable the passage of said hydraulic medium.

References Cited in the file of this patent

UNITED STATES PATENTS

| | | |
|---|---|---|
| 853,974 | Hayden | May 21, 1907 |
| 2,140,633 | Kocks | Dec. 20, 1938 |
| 2,382,437 | Molly | Aug. 14, 1945 |

FOREIGN PATENTS

| | | |
|---|---|---|
| 992,512 | France | July 11, 1951 |
| 1,030,094 | France | Mar. 11, 1953 |
| 868,997 | Germany | Mar. 2, 1953 |